(12) United States Patent
Handschuh et al.

(10) Patent No.: US 11,865,762 B2
(45) Date of Patent: Jan. 9, 2024

(54) APPARATUS FOR TRANSFORMING PLASTIC PREFORMS INTO PLASTIC CONTAINERS HAVING A PROPORTIONAL VALVE

(71) Applicant: KRONES AG, Neutraubling (DE)

(72) Inventors: Eduard Handschuh, Donaustauf (DE); Klaus Voth, Obertraubling (DE)

(73) Assignee: KRONES AG, Neutraubling (DE)

( * ) Notice: Subject to any disclaimer, the term of this patent is extended or adjusted under 35 U.S.C. 154(b) by 15 days.

(21) Appl. No.: 17/091,040

(22) Filed: Nov. 6, 2020

(65) Prior Publication Data

US 2021/0146595 A1 May 20, 2021

(30) Foreign Application Priority Data

Nov. 19, 2019 (DE) .......................... 102019131188.8

(51) Int. Cl.
*B29C 49/42* (2006.01)
*B29C 49/62* (2006.01)
*B29C 49/78* (2006.01)

(52) U.S. Cl.
CPC ...... *B29C 49/4284* (2013.01); *B29C 49/4289* (2013.01); *B29C 49/62* (2013.01); *B29C 49/783* (2013.01); *B29C 49/78* (2013.01)

(58) Field of Classification Search
CPC ... B29C 49/78; B29C 49/783; B29C 49/4289; B29C 49/4284; B29C 49/62; B29C 49/36; B29C 2949/78537; B29C 2949/78445; B29C 49/06; B29C 49/12; Y02P 70/10
See application file for complete search history.

(56) References Cited

U.S. PATENT DOCUMENTS

| 5,169,705 | A | * | 12/1992 | Coxhead | ................. | B29C 49/78 |
| | | | | | | 425/530 |
| 2010/0156009 | A1 | * | 6/2010 | Voth | .................... | B29C 49/4236 |
| | | | | | | 425/538 |
| 2011/0175246 | A1 | * | 7/2011 | Winzinger | .............. | B29C 48/92 |
| | | | | | | 425/170 |
| 2015/0042021 | A1 | | 2/2015 | Schmid | | |
| 2016/0114519 | A1 | * | 4/2016 | Dachs | ................. | B29C 49/4205 |
| | | | | | | 264/547 |

FOREIGN PATENT DOCUMENTS

DE 10 2016 013635 A1 5/2018
WO 2014/068080 A1 3/2014

* cited by examiner

*Primary Examiner* — Monica A Huson
(74) *Attorney, Agent, or Firm* — Schmeiser, Olsen & Watts, LLP (57) ABSTRACT

Provided is an apparatus for transforming plastic preforms into plastic containers having at least one transforming station which has a blow molding device, within which the plastic preforms are able to be transformed into the plastic containers by application with a flowable medium, having an application device which applies the flowable medium to the plastic preforms and having a stretching device which has a rod-like body which is able to be introduced into the plastic preforms, in order to stretch the plastic preforms at least temporarily during their transforming process in the longitudinal direction thereof, wherein the stretching device has a drive device for moving the rod-like body as well as a control device for controlling the drive device and wherein the apparatus has a valve arrangement which controls the application of the plastic preforms with the flowable medium with at least two different pressure levels.

18 Claims, 10 Drawing Sheets

APPARATUS FOR TRANSFORMING PLASTIC PREFORMS INTO PLASTIC CONTAINERS HAVING A PROPORTIONAL VALVE

CROSS-REFERENCE TO RELATED APPLICATION

This application claims priority to German Application No. 10 2019 131188.8, having a filing date of Nov. 19, 2019, the entire contents of which are hereby incorporated by reference.

FIELD OF TECHNOLOGY

The following relates to an apparatus and a method for transforming plastic preforms into plastic containers. Such apparatuses and methods have long been known from the conventional art. It is customary here for heated plastic preforms to be acted upon with a flowable, in particular a gaseous medium, in order to be expanded in this way. Recently, it has also been proceeded to expand plastic preforms directly by a liquid, in particular by a product to be filled. The following is applicable to both embodiments, however, to the usage of a gaseous medium such as (sterile) air.

BACKGROUND

Usually, the plastic preforms are here acted upon with various pressure levels. It is known for example that the plastic preforms are initially acted upon with a pre-blowing pressure and subsequently with an intermediate blowing pressure and finally with a final blowing pressure. For switching such pressures, usually, two-way valves are used. These valves can have a prefixed air choke. The respective points in time when the valves are opened can for example be coupled to the movement of a so-called stretching rod which stretches the plastic preforms in their longitudinal direction.

Although this approach has approved to be successful, there is the advantage that during a pre-blowing process e. g. the volume and/or mass flow as a function of a stretch rod position and also vice versa the parameter of a stretching drive, such as the position, the speed or the acceleration to perform the volume flow change cannot be varied. A drill cross section of such valves or chokes is usually fixed and cannot be changed even during a transforming process.

SUMMARY

An aspect relates to making such apparatuses and methods more versatile and to enable interventions, if necessary, also during a production.

An apparatus according to embodiments of the invention for transforming plastic preforms into plastic containers has at least one transforming station which has a blow molding device within which the plastic preforms are able to be transformed into the plastic containers by application with a liquid medium. Furthermore, the apparatus has an application device which applies the liquid medium to the plastic preforms, as well as a stretching device which has a rod-like body which is able to be introduced into the plastic preforms, in order to stretch the preforms at least temporarily during their transforming process in their longitudinal direction, wherein the stretching device has a drive device for moving the rod-like body, as well as a control device for controlling the drive device and wherein the device has a valve arrangement which controls the application of the plastic preforms with the liquid medium. Furthermore, this valve arrangement enables the application of the plastic preforms with at least two different pressure levels and this valve arrangement has at least one proportional valve.

According to embodiments of the invention, the control device controls the drive device as a function of a valve position of the proportional valve and/or the valve arrangement enables a recycling of the liquid medium, wherein this recycling of the liquid medium takes place by using the proportional valve.

In the first embodiment according to the invention it is therefore proposed that the stretch rod drive is controlled also by using data and/or characteristics of the proportional valve, in particular data and/or characteristics which are characteristic for an opening and/or closing condition of the proportional valve.

This approach allows further refining of the degree of stretching of the material. Furthermore, it would be possible to include the characteristics of the heating of the plastic preforms in the process described here, that is, in particular also to be designed as a function of the proportional valve (or a valve position of this proportional valve).

It is therefore in particular a controllable valve proposed, that is, in particular a valve, the flow cross-section of which or the valve position of which is adjustable and/or controllable between two end positions, in particular a fully closed and a fully opened position.

Recycling is understood to mean within the scope of the present application that the flowable medium, for example the blowing air is provided being under different pressure (levels) and is fed back from a higher pressure level again to a reservoir with a lower pressure level. In this way, blowing air, in particular pressurized blowing air, can be saved.

It is therefore proposed in an embodiment that a valve block and in particular a high-pressure valve block has a proportional valve for at least one air stream, in particular for the later described air stream P1, in a stretch blow molding machine. Here, this valve block can recycle the air in the P1-stream.

In a further embodiment, a proportional valve is provided for switching the lowest pressure level. The above-mentioned proportional valve is in particular able to recycle the air in this stream.

In an embodiment, the transforming station is arranged on a carrier, in particular on a movable carrier and in particular on a rotatable carrier. This can be a so-called blowing wheel.

In a further embodiment, the drives for the rod-like body or the so-called stretching rods can be motor drives and in particular electric motors. In the state of the art these stretching rod movements usually take place by a cam control or by drives being controlled by guiding cams. In this case, the movement of the individual stretching rods for the stations cannot be varied. By providing electric drives, the drive of the stretching rod of each transforming station can be controlled separately, even if several transforming stations are provided.

In a further embodiment, the application device has a blow nozzle which is able to be fitted onto the mouth of the plastic preform.

Here, it is possible that a further drive device is provided which approaches the application device to the plastic preforms.

In a further embodiment, the valve arrangement has several valves. These several valves can serve to switch several pressure levels. It is for example possible for a first pressure P1 to be provided, further an intermediate blowing pressure Pi, further a final blowing pressure P2. A further valve can be provided, in order to release pressurized air from the already expanded container. This pressure level is below indicated as exhaust (Ex).

In a further advantageous embodiment, the apparatus has a feeding device, in order to feed plastic preforms to the transforming station and/or a discharge device which discharges the containers which have already been blow molded from the transforming stations. There are several such transforming stations arranged on the above-mentioned carrier.

In a further advantageous embodiment, a control device is provided which controls the above-mentioned proportional valve. Advantageously, this control device controls and in particular regulates here the proportional valve and in particular its position on the basis of a nominal curve. Within this curve it is determined, how the individual positions of the proportional valve can be approached. For the arrangement or the embodiment of the different valves there are several options conceivable.

It would be possible that a proportional valve for the pre-blow molding process (the lowest pressure P1) and a second valve for the final blow molding with the pressure P2 of the container is provided. Furthermore, a venting valve for releasing air into the atmosphere is provided. These three last-mentioned valves are here in particular no proportional valves or conventional valves, for example two-way valves.

In a further embodiment, it would also be possible for a valve arrangement or the valve block to have a proportional valve for the pre-blow molding, as well as a second proportional valve for the intermediate blow molding and a third valve for the final blow molding, wherein this third valve can also be designed as a conventional valve.

Furthermore, a venting valve for releasing the air into the atmosphere is provided here as well. As described above, in order to optimize the degree of stretching of the material of the bottle, it is proposed to control and/or regulate the drive for the rod-like body or the stretching rod and the proportional valve in a mutually dependent manner.

To this end, a control circuit can be provided which takes into account the proportional valve and the drive for the stretching rod and/or controls as a function of each other.

In an embodiment, the volume stream of the pre-blowing valve and the lifting of the rod-like body can be aligned and predetermined nominal curves can be followed during a pre-blowing process.

Alternatively or additionally, it would also be possible to incorporate the control circuit of the preform heating into a control circuit of stretching and/or blow molding.

Embodiments of the invention implicate the advantages that the material of the plastic preforms can be stretched better or more favorable and can also be distributed more defined. In this way, in particular also a desired distribution of weight can be achieved.

Furthermore, a flexible adjustment of the pre-blowing parameter is possible. Additionally, a quick recipe adjustment of the plastic bottles is enabled.

Within the scope of the second embodiment according to the invention, it is possible that a recycling of the flowable medium also takes place via the proportional valve for example in a duct with a lower pressure level. This is in particular possible, if the proportional valve is also used for controlling the first pressure level (P1) and/or the pressure level with the lowest pressure.

In a further advantageous embodiment, the apparatus has a detection device for detecting a position of the rod-like body. Here, in particular a position of the rod-like body with respect to the plastic preform is detected and/or a position in the longitudinal direction of the rod-like body. Additionally, it is also possible that the detection device detects a moving speed of the rod-like body, in particular a movement in the longitudinal direction thereof.

Additionally, it is also possible that the detection device detects an acceleration of the movement of the rod-like body. In an embodiment, the proportional valve is used for recycling of air in the P1-stream as described in more detail below.

By means of the above-described alignment of the volume stream of the pre-blowing valve and the lifting of the rod-like body, also predetermined nominal curves can be followed, in particular also during the pre-blowing process.

A rod-like body is understood to be a body which extends in a direction, in particular in a longitudinal direction. Additionally, the rod-like body can also extend in directions perpendicular to the longitudinal direction, however, significantly less than in the direction.

In a further embodiment, the apparatus has a first reservoir for storing the flowable medium being under a first pressure and a second reservoir for storing a flowable medium being under a second pressure which in particular differs from the first pressure. In this way, so-called annular ducts can be provided, in which pre-blowing air being under different pressure levels can be stored. Starting from these reservoirs, the plastic preform can be acted upon with different pressure levels. These reservoirs are arranged on the carrier where the transforming stations are arranged as well, such as in particular but not exclusively the blowing wheel.

Furthermore, it is also possible that pressurized air is also recycled in the reservoir which is used for the lower pressure. Recycling is understood to mean in particular a feeding of pressurized air back into the reservoir with the lower pressure. In an embodiment, this valve arrangement or the valve block has several valves. These valves are assigned to different pressure levels, such as a pre-blowing pressure P1, an intermediate blowing pressure Pi and a final blowing pressure P2. These valves are switchable independently from each other.

In the expansion process, first of all a pre-blowing of the plastic preforms takes place, subsequently an intermediate blow molding and finally a final blow molding. Ultimately, a pressure release of the plastic preforms can also take place via a further valve or the air can be released from the plastic container.

In a further embodiment, the above-mentioned proportional valve can also operate as an exclusive switching valve. This means that the proportional valve can also be switched between two positions, namely a closed and an opened position.

In a further embodiment, the apparatus has a valve control device which is used for controlling at least one of the valve devices and in particular the proportional valve. This control device can here communicate with the control device for controlling the drive of the stretching rod.

In a further embodiment, the proportional valve is able to be cleaned and in particular also with a sterilization medium, such as hydrogen peroxide. In this way also a sterile operation mode of the forming device is possible. The proportional valve is at least partially made of materials which are resistant with respect to hydrogen peroxide.

In an embodiment, the apparatus can have a clean room within which the transformation of the plastic preforms into the plastic containers takes place. This clean room can here be delimited relative to an (unsterile) environment by walls being movable relative to each other.

In a further embodiment, the proportional valve has a venting function. Here, into the proportional valve a further valve element can be incorporated, such as a non-return valve function or as well as a further switchable valve. This venting function can here effect a venting of the containers to be expanded during the blow-molding process.

Here, it is also possible that the apparatus has two or more proportional valves.

In a further embodiment, the proportional valve is arranged around the rod-like body and/or around a blowing piston. Here, it is possible that above or under the proportional valve a further process valve is arranged. Under or above is understood to mean an arrangement in a vertical direction or in a longitudinal direction of the stretching rod.

In general, the proportional valve is arranged in a row of a plurality of valves being closest to the application device.

As mentioned above, beside the proportional valve a further process valve can be provided.

Additionally, it would also be possible that the proportional valve is arranged next to a blowing piston.

In a further embodiment, the transforming station can be arranged stationary or on a movable and in particular rotatable blowing wheel.

In a further embodiment, the drive for the rod-like body or the stretching drive and the proportional valve or its drive are dependent on each other or operate dependent on each other.

As mentioned above, in an embodiment the proportional valve follows a nominal curve. Here, it is in particular conceivable that in case of an intermediate blow molding and a final blow molding the container nominal pressure lies within a range that is determined by limiting points and/or limiting curves.

In a further embodiment, therefore, the valve arrangement has in particular adjacent to the proportional valve at least one further valve device.

Embodiments of the invention are furthermore directed to a method for transforming plastic preforms into plastic containers by at least one transforming station which transforming station has a blow molding device within which the plastic preforms are transformed into the plastic containers by being acted upon with a flowable medium and wherein an application device applies the flowable medium to the plastic preforms and further has a rod-like body which is introducible into the plastic preforms and which stretches the plastic preforms in their longitudinal direction at least temporarily during the transforming process thereof, wherein by a drive device of the stretching device this rod-like body is being moved and a control device controls the drive device and wherein by a valve arrangement the application of the plastic preforms with the flowable medium takes place, wherein this valve arrangement performs the application of the plastic preforms by using at least two different pressure levels and this valve arrangement has at least one proportional valve.

According to embodiments of the invention, the control device controls the drive device as a function of a valve position of the proportional valve and/or the valve arrangement enables a recycling of the flowable medium, wherein this recycling of the flowable medium takes place by using the proportional valve. By using the proportional valve is understood to mean that a stream of the flowable medium is at least temporarily guided via the proportional valve during the recycling process.

BRIEF DESCRIPTION

Some of the embodiments will be described in detail, with reference to the following figures, wherein like designations denote like members, wherein.

DETAILED DESCRIPTION

Figure 1:
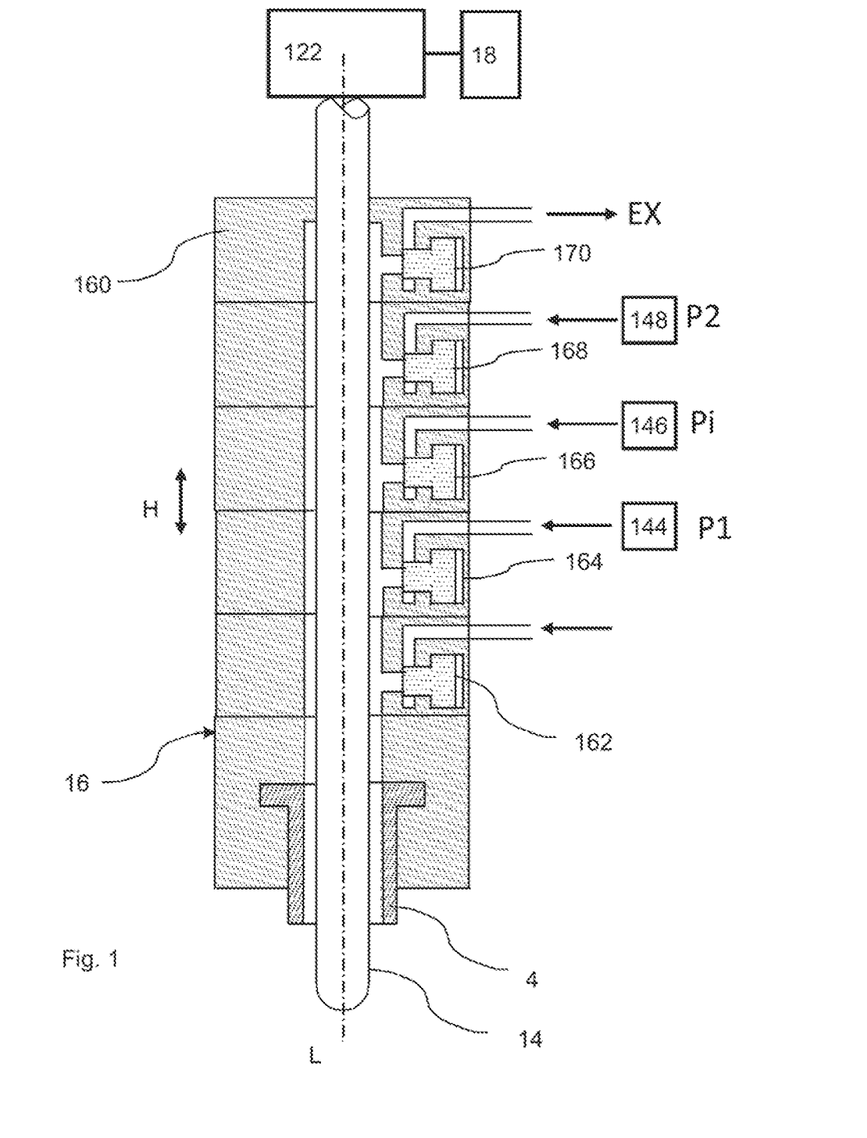
FIG. 1 shows a depiction of a valve block according to embodiments of the invention.

FIG. 1 shows a schematic depiction of a valve arrangement 16, hereafter also being indicated as valve block. This valve block is here arranged around a stretching rod 14. This stretching rod or this rod-like body is introduced into a plastic preform (not shown in FIG. 1) in order to stretch the same during its expansion in the longitudinal direction thereof. For this purpose, a drive 122 (only schematically shown) is provided, as well as a control device 18 for controlling this drive.

Reference numeral L indicates the longitudinal direction of the rod-like body and therefore also the main stretching direction thereof.

Reference numeral 4 indicates an application device and in particular a blowing nozzle which is able to be placed on the mouth of the plastic preform. This application device is able to be placed on the mouth of a plastic preform, in order to expand the same. As a whole, it is possible here that the entire valve block 16 is able to be approached to the plastic preform (not shown) by a movement in the lifting direction H, in order to expand the same with blowing pressure.

The valve block has in this embodiment as shown here altogether five valve devices, namely the valves 162, 164, 166, 168 and 170. The valve device 162 is here formed as a proportional valve and the valve 164 as a recycling valve.

The individual valves are controlling different pressure levels here. Reference numeral P1 indicates here a pre-blowing pressure, reference numeral Pi an intermediate pressure and reference numeral P2 a final blowing pressure. Pressure Pi is greater than pressure P1 and pressure P2 is greater than pressure Pi.

Reference numeral EX indicates an exhaust, this means that residual pressurized air is here released again after the expansion of the plastic preforms. Reference numeral 160 indicates the valve housing or the housing of the valve block. With the embodiment shown here, reference numeral 166 indicates the intermediate blow molding valve, reference numeral 168 indicates the final blow molding valve and reference numeral 170 indicates the exhaust valve.

The proportional valve is here arranged laterally at the stretching rod or the rod-like body 14 and here upward above the application device or blowing nozzle 4.

Reference numerals 144, 146 and 148 indicate roughly schematically reservoirs which serve for storing pressurized air having different pressure levels. These reservoirs can for example be designed to be annular ducts which are arranged on the movable carrier, on which the transforming stations are arranged as well.

Figure 2:
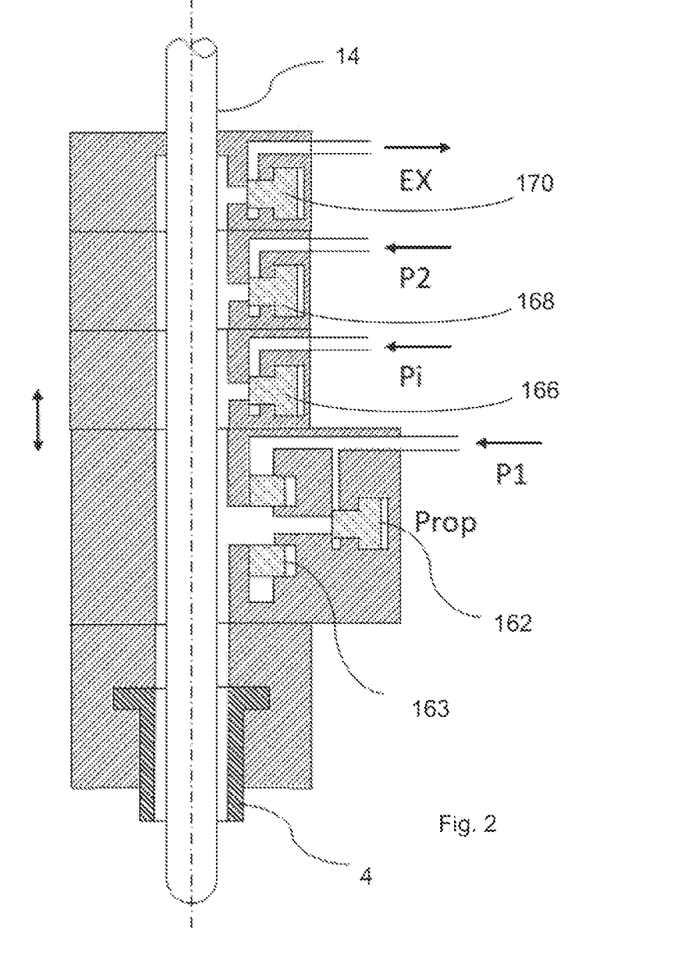
FIG. 2 shows a further depiction of an embodiment of a valve block.

FIG. 2 shows a further embodiment of a valve block according to embodiments of the invention. For simplification, the drive of the stretching rod and the controlling are here not shown anymore.

The pressure levels P1, Pi, P2 and the exhaust EX are depicted here again. Reference numeral 162 indicates again the proportional valve which serves for controlling the supply of pressure level P1. Furthermore, a valve 163 is provided here which is used for recycling the pressurized air. After a finished blow molding process, the high pressure can be fed from the now expanded bottle by this valve back into that reservoir which stores the pressurized air being under pressure level P1.

The individual pressurized air reservoirs which are used for having the pressure level P1, Pi and P2 available, are not depicted in FIG. 2. In this embodiment, the proportional valve 162 is again arranged just laterally of the rod-like body 14 and upward above the blowing nozzle and has an additional recycling valve 163, as already mentioned, which can be here, however, designed as a two way valve.

Reference numeral 180 indicates only a roughly schematic depicted detection device which detects a position of the proportional valve 162. In this way, by using such measured values which relate to the proportional valve, it is possible to also control the movement of the stretching rod. Additionally, the proportional valve 162 can also have a drive which controls the proportional valve.

Figure 3:
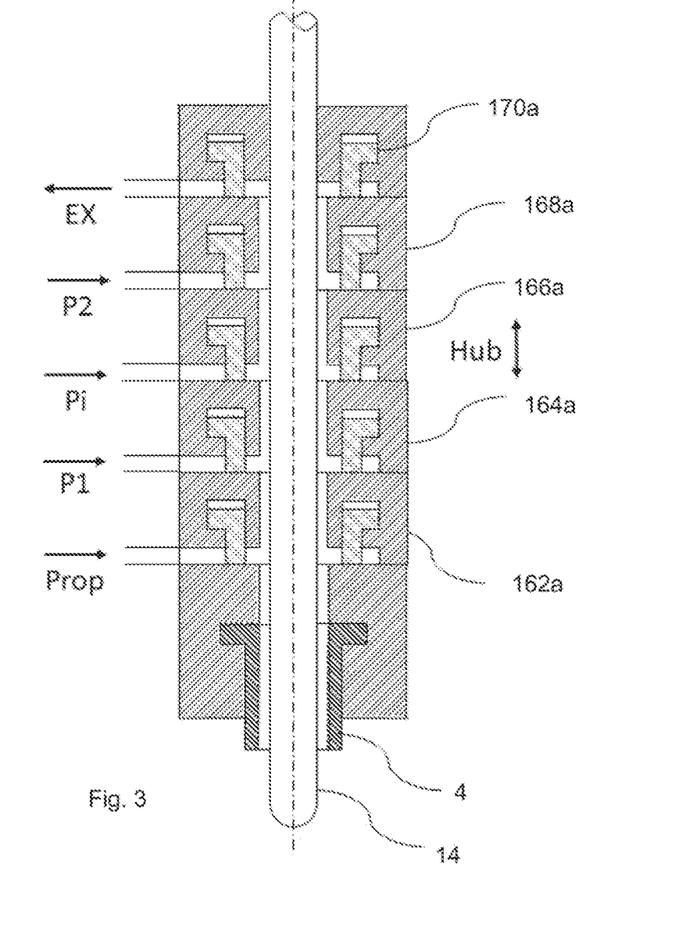
FIG. 3 shows a further depiction of a valve block according to embodiments of the invention.

FIG. 3 shows a further embodiment of a valve arrangement according to embodiments of the invention or of a valve block according to embodiments of the invention. Here again, a proportional valve 162a is provided as well as further valves 164a, 166a, 168a and 170a. In contrast to the figures shown before, the individual valves are here arranged around the stretching rod 14 respectively. The proportional valve 162a is here also directly arranged around the stretching rod and upward above the blowing nozzle 4. Reference numeral 164 serves here as a recycling valve and is here located above the proportional valve 162a. This means that it is possible for a recycling to be performed via the valve 164. Alternatively, the proportional valve can here again, similar as shown in FIG. 2, serve as a recycling valve. In this embodiment, it is possible to omit the recycling valve 164a.

Figure 4:
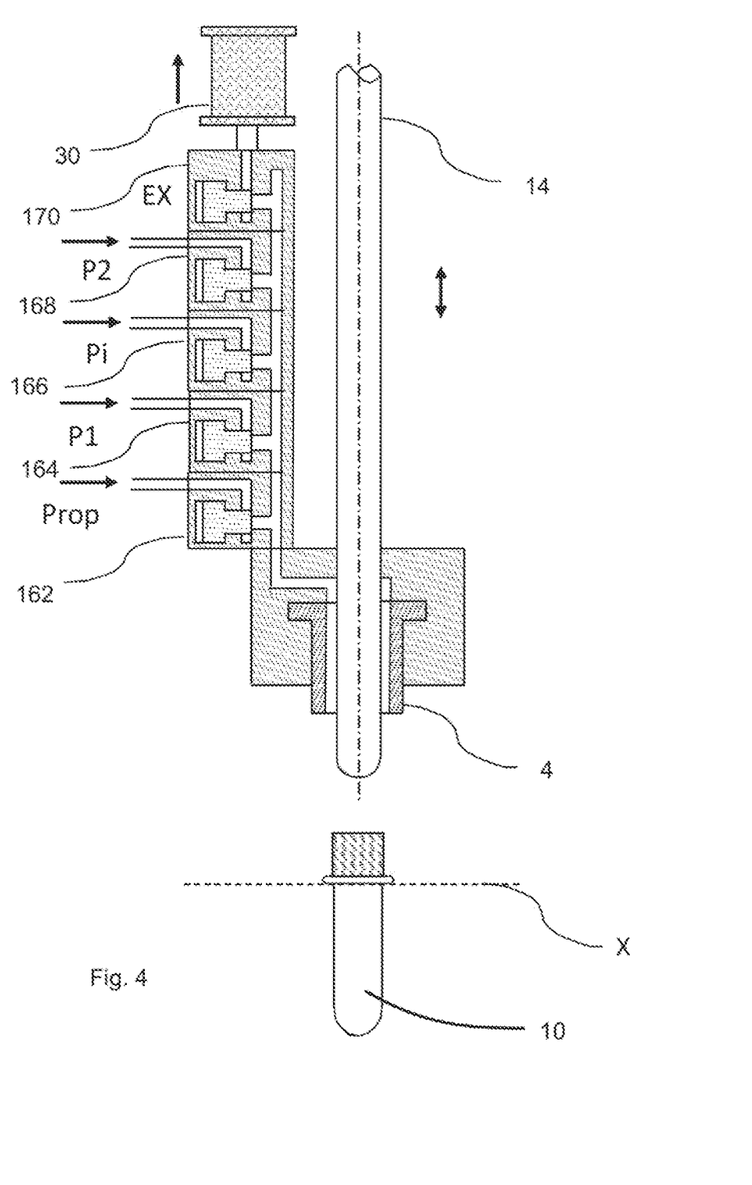
FIG. 4 shows further depiction of a valve block according to embodiments of the invention together with a plastic preform.

FIG. 4 shows a further embodiment of a valve arrangement according to the invention having a plastic preform 10. Reference numeral X indicates here the transport path along which the plastic preform is transported during its transforming process. In the depiction as shown in FIG. 4, the entire high pressure valve unit or the valve block 16 are arranged laterally next to the rod-like body, that means the stretching rod. The proportional valve 162 is here again arranged directly in first place above the blowing nozzle 4.

In this way, the air stream paths passing through the proportional valve are shorter than the air stream paths of the other valves respectively.

Reference numeral 30 relates to a sound absorber which is arranged at the exhaust valve 170 (EX).

Alternatively, the proportional valve can here again, similar as shown in FIG. 2, serve as a recycling valve. In this embodiment, the recycling valve 164 can be omitted.

Figure 5:
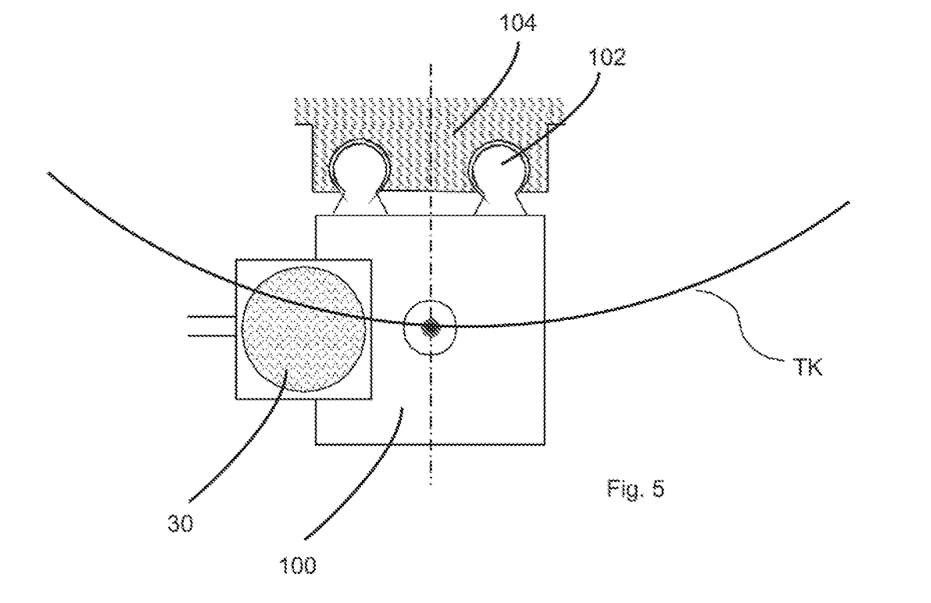
FIG. 5 shows an aerial perspective view of the valve block as shown in FIG. 4.

FIG. 5 shows an aerial perspective on the arrangement as shown in FIG. 4. As mentioned, the proportional valve is located laterally next to the stretching rod. As mentioned, the whole valve arrangement is completely lifted or lowered and via a linear guide 102, 104. In this area linear motors and/or pneumatical drives can be provided as well. Reference numeral TK indicates the pitch circle along which the plastic preforms are conveyed.

Figure 6:
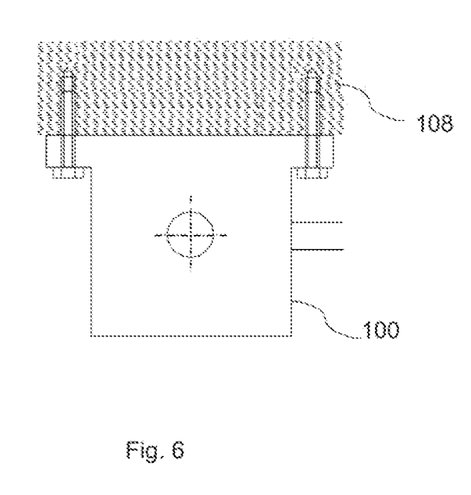
FIG. 6 shows a depiction for illustrating the mounting of a valve block.

FIG. 6 shows an embodiment for illustration of the mounting of the stretching rod arrangement and/or the valve block 100 on a carrier 108.

Figure 7:
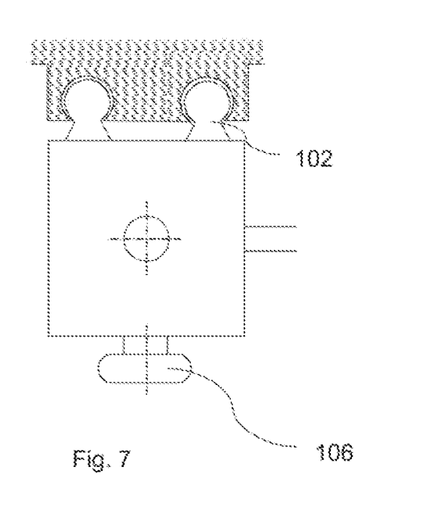
FIG. 7 shows further depiction for illustrating the mounting of a valve block.

FIG. 7 shows a further illustration in which additionally a rail wheel 106 is provided. This rail wheel 106 follows a guiding cam (not shown) and the movement of the valve arrangement in the lifting direction is controlled in this way.

Figure 8A:
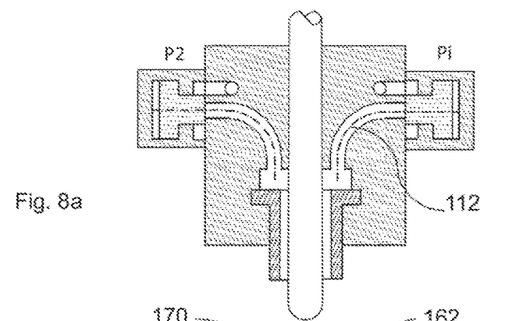
FIG. 8a shows a depiction for illustration of a valve block according to embodiments of the invention.
Figure 8B:
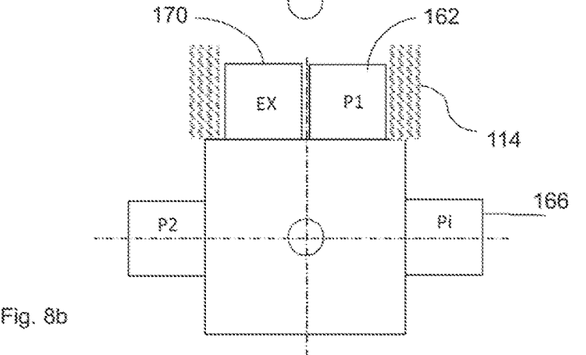
FIG. 8b shows a depiction for illustration of a valve block according to embodiments of the invention.

FIGS. 8a and 8b show two perspectives of a valve block according to the invention in a further embodiment. In this embodiment, the different valves are distributed at different positions in the circumferential direction around the stretching rod or the rod-like body. In this way, it is even possible for several valves to shorten the stream paths. In the embodiment shown here, the proportional valve is arranged on the backside of the valve block. Reference numeral 114 indicates a valve block mounting. FIG. 8b shows air ducts 112 in the inside of the valve block which connect the valves with the application device fluidically.

Figure 9A:
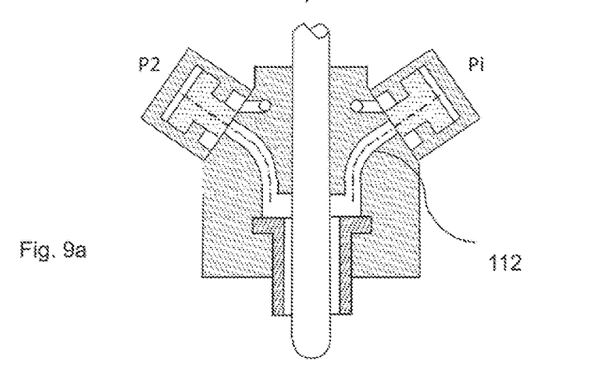
FIG. 9a shows a further depiction for illustration of a valve block.
Figure 9B:
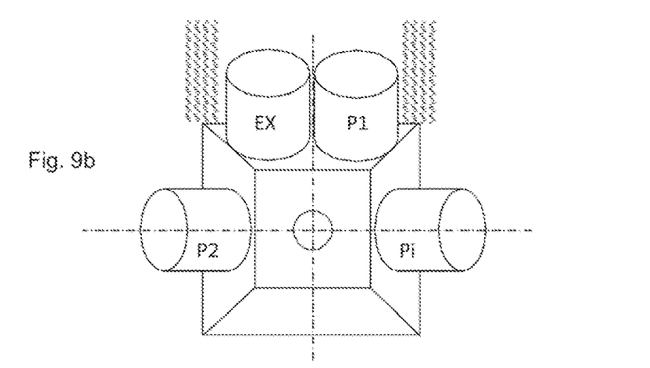
FIG. 9b shows a further depiction for illustration of a valve block.

FIGS. 9a and 9b show a further embodiment of the valve block according to the invention. Here, the valves are positioned obliquely against the valve housing. This means that the valve pistons of these valves move in a direction which is obliquely to the longitudinal direction of the rod-like body. Also in the depiction as shown in FIG. 9b this oblique arrangement is noticeable. More precise, the individual valves are arranged such that they have an optimal flow channel in their inside which can for example extend at an angle of 45°.

The movement directions of this valve devices extend at an angle relative to the longitudinal direction of the rod-like body which is between 30° and 60°, or between 40° and 50°.

Figure 10:
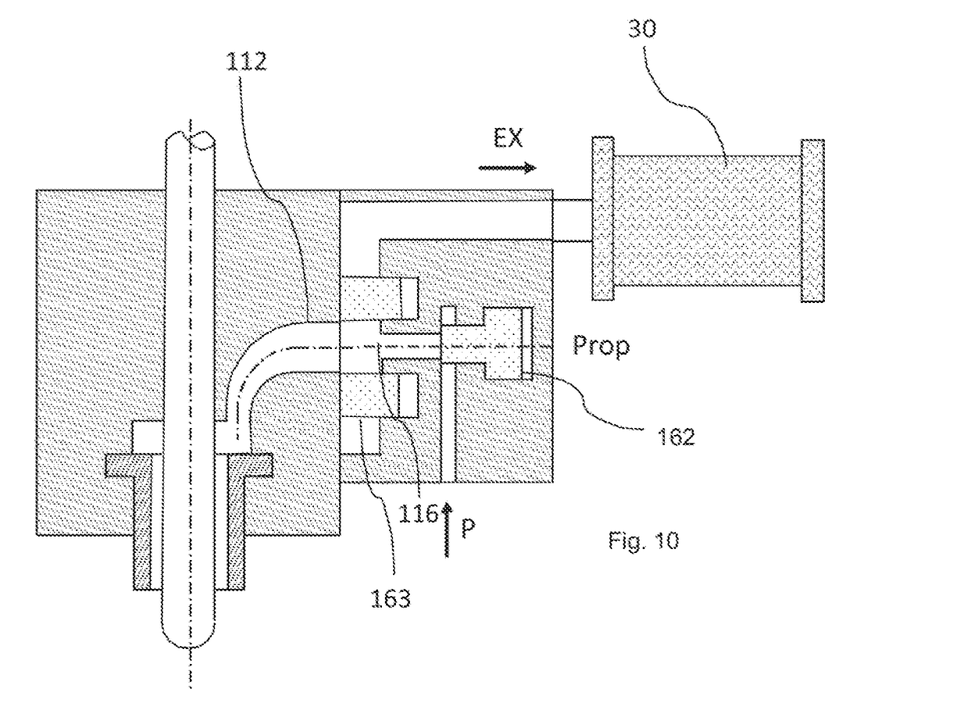
FIG. 10 shows a side view of a valve block.

FIG. 10 shows a further depiction of a valve arrangement according to the invention. Here again, a sound absorber 30 is shown, as well as an air duct 112. Reference numeral 116 indicates an air duct which supplies the proportional valve. Reference numeral 163 indicates a valve device which is used for ventilation, wherein here the ventilation takes place via the proportional valve 162. This ventilation valve is here arranged around the air duct 116.

Figure 11:
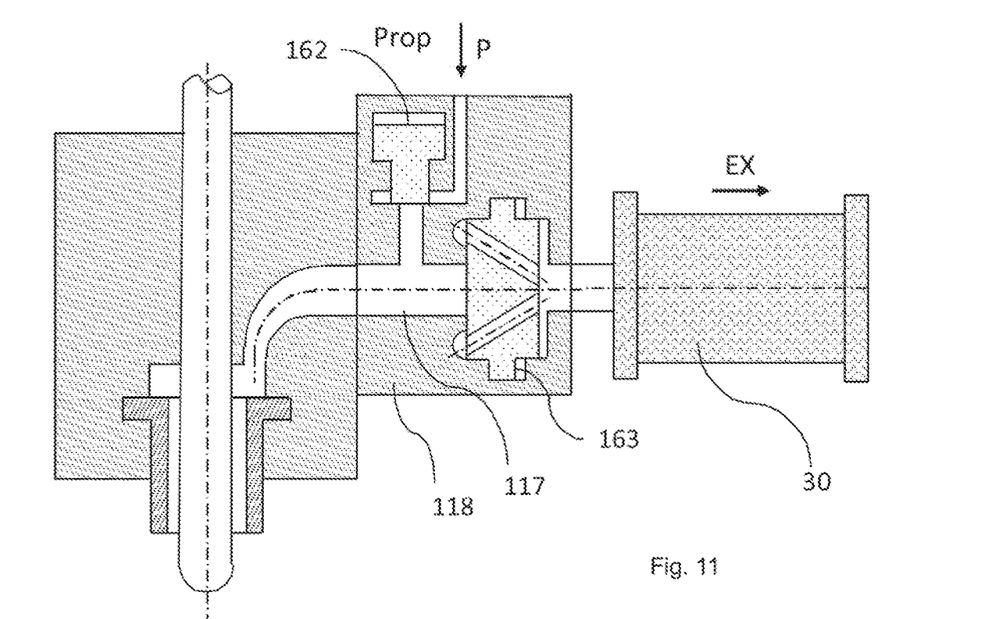
FIG. 11 shows a further side view of a valve block.

FIG. 11 shows a further embodiment of the present invention. Here again, a proportional valve 162 as well as a ventilation valve 163 is provided. In this embodiment, an air duct 117 branches off in the direction of the proportional valve 162 and the ventilation valve 163. Reference numeral 118 indicates a valve housing.

Figure 12:
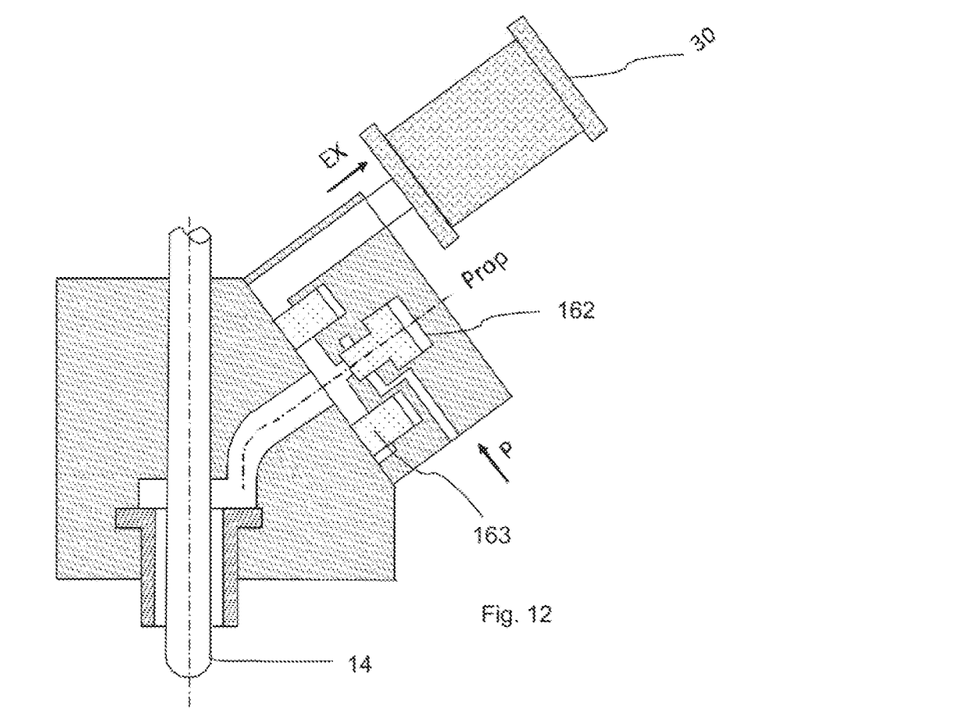
FIG. 12 shows a side view of a further embodiment of a valve block.

FIG. 12 shows an embodiment in which the proportional valve 162 and the ventilation valve 163 are positioned obliquely against the valve arrangement or the housing thereof.

Figure 13:
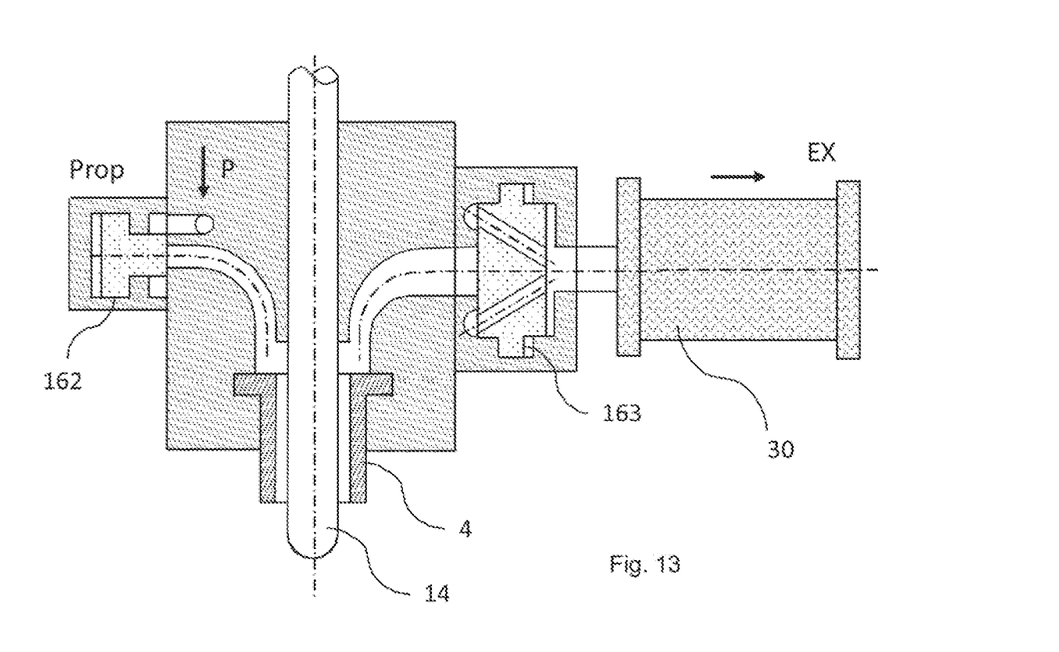
FIG. 13 shows a side view of a further embodiment of a valve block.

In the embodiment shown in FIG. 13 there is likewise a proportional valve 162 and a ventilation valve 163 provided. They are arranged in the circumferential direction of the rod-like body 14 at different positions and in particular opposite to each other.

Figure 14:
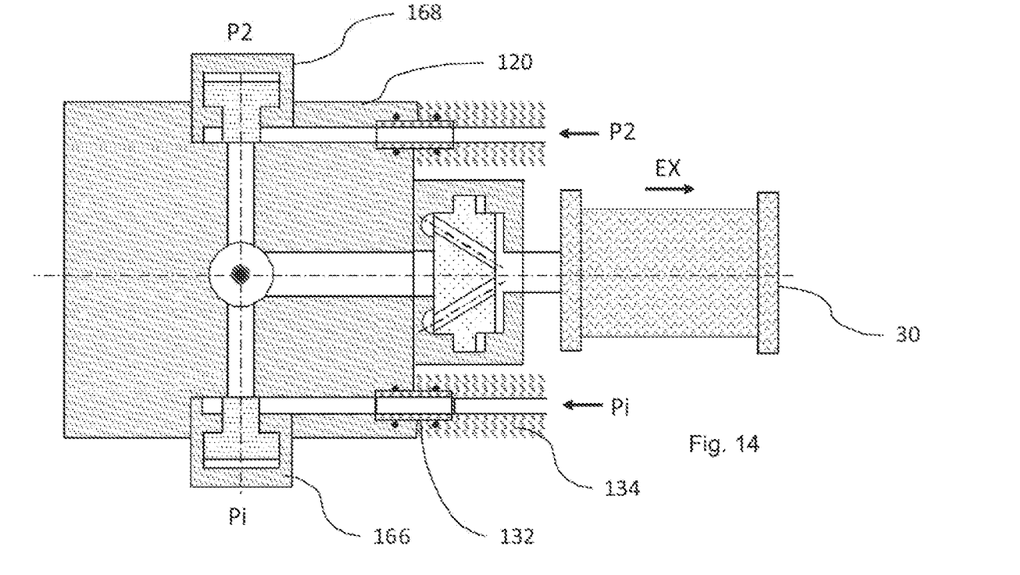
FIG. 14 shows a further side view of an embodiment of a valve block.

FIG. 14 shows an aerial perspective of a further embodiment of a valve device according to the invention. Here, the valve devices 166 and 168 are arranged opposite to each other. Reference numeral 132 relates to a mounting device, in order to mount a pressure feeding line 134 on the valve block.

Figure 15:
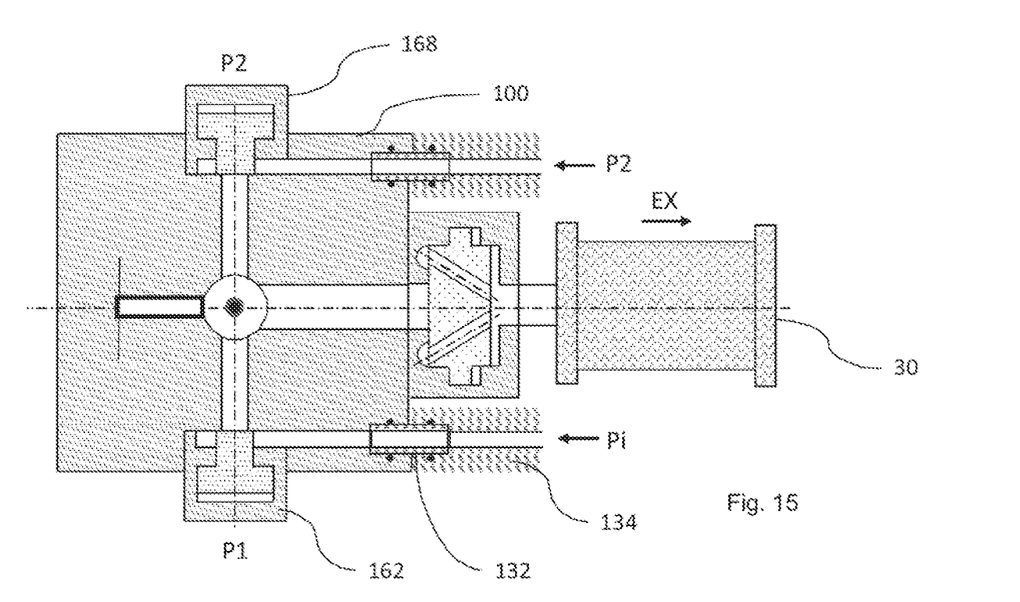
FIG. 15 shows a further side view of an embodiment of a valve block.

With the embodiment shown in FIG. 15, the proportional valve 162 and the valve device 168 are arranged opposite to each other in order to switch or control the pressure P2.

Figure 16:
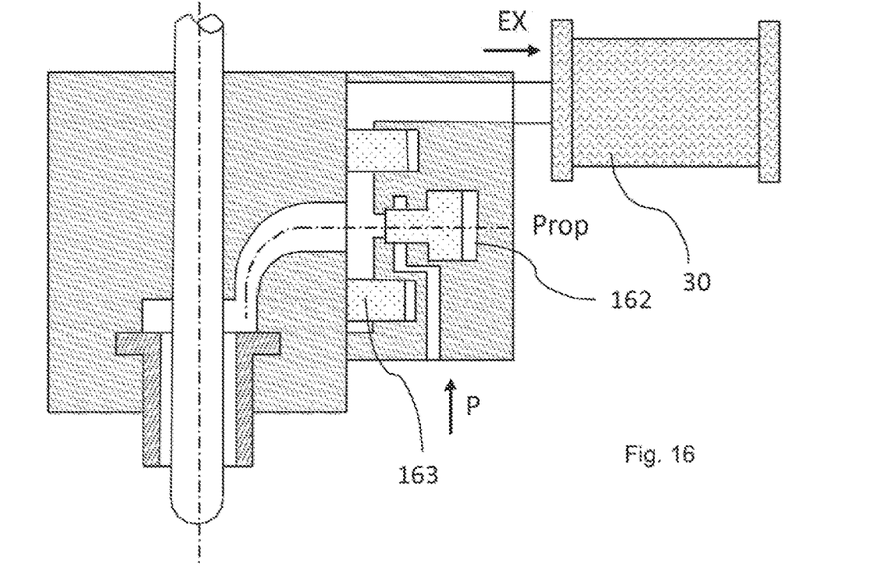
FIG. 16 shows a further side view of an embodiment of a valve block.

FIG. 16 shows a further embodiment, in which the proportional valve 162 and the ventilation valve 163 are arranged laterally next to the rod-like body 14 and are connected to the application device 4 via a curved air duct.

Figure 17:
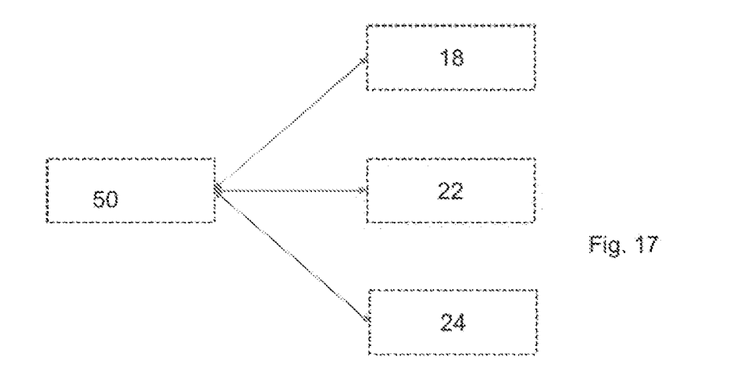
FIG. 17 shows a depiction for illustration of the controlling of an apparatus according to embodiments of the invention.

FIG. 17 shows roughly schematically the controlling or regulation processes for an apparatus according to the invention. Here, there is a process control device 50 provided which controls the entire transforming station. This one again communicates with the control device 18 which controls the drive for the stretching rod. Additionally, the processing control device 50 can also communicate with the valve control device 22 which in turn controls the individual valves and in particular the proportional valve 162. Alternatively, the control devices 18 as well as the valve control devices can communicate with each other.

Additionally, as shown in FIG. 17, the process control device 50 can also communicate with the control device 24 for controlling a heating device for heating the plastic preforms.

Figure 18:
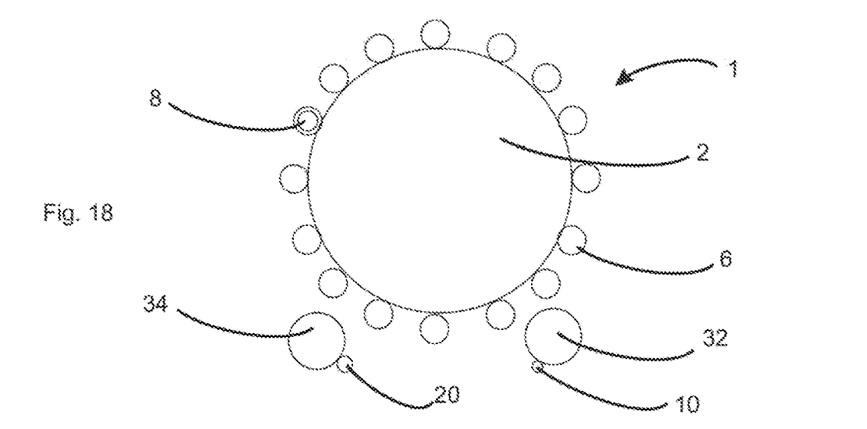
FIG. 18 shows a schematic depiction of an apparatus according to embodiments of the invention.

FIG. 18 shows a schematically depiction of an apparatus for transforming plastic preforms 10 into plastic containers and in particular plastic bottles 20. Here, reference numeral 32 indicates a feeding device such as a transport star which feeds plastic preforms 10 to the apparatus. Reference numeral 32 indicates a further transport device which discharges the finished and transformed containers 20 from the apparatus 1.

The apparatus 1 further has a rotatable carrier 2 on which a plurality of transforming stations 6 are arranged. Each of these transforming stations 6 has a blow molding device 8, within which the plastic preforms are transformed.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

REFERENCE NUMERALS 1 apparatus
2 carrier
4 application device, blowing nozzle
6 transforming station
8 blow molding device
10 plastic preform
14 stretching rod
16 valve block
18 control device
20 container
30 sound absorber
32 feeding device
34 discharge device
100 valve block
102 linear guides
104 linear guides
106 rail wheel
108 carrier
112 air ducts
114 valve block mounting
116 air duct
117 air duct
118 valve housing
132 mounting device
134 pressure feeding line
144 reservoir for pressure P1
146 reservoir for pressure Pi
148 reservoir for pressure P2
122 drive
160 valve housing
162 valve
162a proportional valve
163 valve
164 valve
164a proportional valve
166 valve
166a valve
168 valve
168a valve
170 valve
170a valve
180 detection device
EX exhaust
L longitudinal direction of the rod-like body
P1 pre-blowing pressure
P2 final blowing pressure
Pi intermediate blowing pressure
X transport path

The invention claimed is:

1. An apparatus for transforming plastic preforms into plastic containers having at least one transforming station which has a blow molding device, within which the plastic preforms are transformable into the plastic containers by being acted upon with a flowable medium, having an application device which applies the flowable medium to the plastic preforms and having a stretching device which has a rod-shaped body which is able to be introduced into the plastic preforms, in order to stretch the plastic preforms at least temporarily during their transforming process in the longitudinal direction thereof, wherein the stretching device has a drive device for moving the rod-shaped body as well as a control device for controlling the drive device and wherein the apparatus has a valve arrangement which controls the application of the plastic preforms with a flowable medium, wherein this valve arrangement enables the application of the plastic preforms with at least two different pressure levels and this valve arrangement has at least one proportional valve, wherein the control device controls the drive device as a function of a valve position of the at least one proportional valve, wherein the apparatus has a detection device for detecting a position of the rod-shaped body, wherein the detection device detects a moving speed of the rod-shaped body, wherein the proportional valve is able to be cleaned with a sterilization medium including hydrogen peroxide, and wherein the proportional valve is at least partially made of materials which are resistant with respect to hydrogen peroxide.

2. The apparatus according to claim 1, wherein the apparatus has a first reservoir for storing the flowable medium under a first pressure and a second reservoir for storing the flowable medium under a second pressure.

3. The apparatus according to claim 1, wherein the proportional valve is used for feeding a first, lower pressure into the plastic preforms.

4. The apparatus according to claim 1, wherein the proportional valve can also act as a switching valve.

5. The apparatus according to claim 1, wherein the proportional valve has a ventilation function.

6. The apparatus according to claim 1, wherein the proportional valve is arranged around at least one of the rod-shaped body and around a blow piston.

7. The apparatus according to claim 1, wherein adjacent to the proportional valve there is a further valve device provided.

8. The apparatus according to claim 1, wherein the valve arrangement enables a recycling of the flowable medium, wherein the recycling of the flowable medium takes place by using the proportional valve.

9. The apparatus according to claim 1, wherein the valve arrangement or a valve block has a proportional valve for the pre-blow molding, as well as a second proportional valve for the intermediate blow molding and a third valve for the final blow molding.

10. The apparatus according to claim 1, wherein a control circuit is provided which takes into account the proportional valve and the drive for the stretching rod and/or controls as a function of each other, wherein a control circuit of a preform heating is incorporated into the control circuit of the stretching and/or blow molding.

11. The apparatus according to claim 1, wherein the detection device detects an acceleration of the movement of the rod-shaped body.

12. The apparatus according to claim 1, wherein the apparatus has a clean room within the transformation of plastic preforms into plastic containers takes place.

13. The apparatus according to claim 1, wherein the apparatus has two or more proportional valves.

14. The apparatus according to claim 1, wherein the proportional valve is arranged in a row of a plurality of valves being closest to the application device.

15. A method for transforming plastic preforms into plastic containers having at least one transforming device which has a blow molding device, within which the plastic preforms are transformed into the plastic containers by being acted upon with a flowable medium wherein an application device applies the flowable medium to the plastic preforms and a stretching device which has a rod-shaped body which is able to be introduced into the plastic preforms which stretches the plastic preforms at least temporarily during their transforming process in the longitudinal direction thereof, wherein by a drive device of the stretching device the rod-shaped body is moved and a control device controls the drive device and wherein by a valve arrangement the application of the plastic preforms with a flowable medium takes place, wherein this valve arrangement performs the application of the plastic preforms with at least two different pressure levels and this valve arrangement has at least one proportional valve, wherein the control device controls the drive device as a function of a valve position of the at least one proportional valve, wherein a detection device detects a position of the rod-shaped body, wherein the detection device detects a moving speed of the rod-shaped body, wherein the proportional valve is able to be cleaned with a sterilization medium including hydrogen peroxide, and wherein the proportional valve is at least partially made of materials which are resistant with respect to hydrogen peroxide.

16. The method according to claim 15, wherein the valve arrangement performs a recycling of the flowable medium, wherein the recycling of the flowable medium takes place by using the proportional valve.

17. An apparatus for transforming plastic preforms into plastic containers having at least one transforming station which has a blow molding device, within which the plastic preforms are transformable into the plastic containers by being acted upon with a flowable medium, having an application device which applies the flowable medium to the plastic preforms and having a stretching device which has a rod-shaped body which is able to be introduced into the plastic preforms, in order to stretch the plastic preforms at least temporarily during their transforming process in the longitudinal direction thereof, wherein the stretching device has a drive device for moving the rod-shaped body as well as a control device for controlling the drive device and wherein the apparatus has a valve arrangement which controls the application of the plastic preforms with a flowable medium, wherein the valve arrangement enables application of the plastic preforms with at least two different pressure levels and the valve arrangement has at least one proportional valve, wherein the valve arrangement enables a recycling of the flowable medium, wherein the recycling of the flowable medium takes place using the proportional valve, wherein the drive device for the rod-shaped body and the proportional valve operate dependent from each other, wherein the apparatus has a detection device for detecting a position of the rod-shaped body, wherein the detection device detects a moving speed of the rod-shaped body, wherein the proportional valve is able to be cleaned with a sterilization medium including hydrogen peroxide, and wherein the proportional valve is at least partially made of materials which are resistant with respect to hydrogen peroxide.

18. A method for transforming plastic preforms into plastic containers having at least one transforming device which has a blow molding device, within which the plastic preforms are transformed into the plastic containers by being acted upon with a flowable medium wherein an application device applies the flowable medium to the plastic preforms and a stretching device which has a rod-shaped body which is able to be introduced into the plastic preforms which stretches the plastic preforms at least temporarily during their transforming process in the longitudinal direction thereof, wherein by a drive device of the stretching device the rod-shaped body is moved and a control device controls the drive device and wherein by a valve arrangement the application of the plastic preforms with a flowable medium takes place, wherein the valve arrangement performs the application of the plastic preforms with at least two different pressure levels and the valve arrangement has at least one proportional valve, wherein the valve arrangement performs a recycling of the flowable medium wherein the recycling of the flowable medium takes place using the proportional valve, wherein the drive device for the rod-shaped body and the proportional valve operate dependent from each other, wherein a detection device detects a position of the rod-shaped body, wherein the detection device detects a moving speed of the rod-shaped body, wherein the proportional valve is able to be cleaned with a sterilization medium including hydrogen peroxide, and wherein the proportional valve is at least partially made of materials which are resistant with respect to hydrogen peroxide.

\* \* \* \* \*